(12) United States Patent
Mori et al.

(10) Patent No.: US 6,794,082 B2
(45) Date of Patent: Sep. 21, 2004

(54) ALKALINE BATTERY

(75) Inventors: Katsumi Mori, Fukushima (JP);
Takumi Ohhara, Fukushima (JP);
Kenji Sato, Fukushima (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/947,978

(22) Filed: Sep. 6, 2001

(65) Prior Publication Data

US 2002/0127469 A1 Sep. 12, 2002

(30) Foreign Application Priority Data

Sep. 8, 2000 (JP) .................................. P2000-273956
Dec. 25, 2000 (JP) .................................. P2000-392872

(51) Int. Cl.$^7$ .......................... H01M 2/08; H01M 4/54; H01M 4/56; H01M 4/32
(52) U.S. Cl. ................... 429/174; 429/175; 429/219; 429/223; 429/224
(58) Field of Search ................... 429/174, 245, 429/175, 218.2, 219, 224, 229, 223

(56) References Cited

U.S. PATENT DOCUMENTS 5,306,580 A * 4/1994 Mansfield et al. .......... 429/175
5,552,757 A * 9/1996 Blecha et al. ................ 337/297
5,576,117 A * 11/1996 Morita et al. ................ 429/162

FOREIGN PATENT DOCUMENTS

GB 2381120 * 4/2003
JP 8-162100 * 6/1996

OTHER PUBLICATIONS

Scarr, Robert F. and Hunter, James C., "Alkaline–Manganese Dioxide Cells", Handbook of Batteries, second edition, 1995, McGraw–Hill, Inc. p. 10.4.*

* cited by examiner

Primary Examiner—Patrick Ryan
Assistant Examiner—Thomas H. Parsons
(74) Attorney, Agent, or Firm—Sonnenschein, Nath & Rosenthal LLP

(57) ABSTRACT

An alkaline battery constructed of a cathode can and an anode cup in such a way that an open end of the cathode can is sealed by the anode cup, with a gasket interposed between them, characterized in that the open end of the anode cup is folded back in U-shape along its periphery and the fold is tightened for hermetic sealing by the internal periphery of the open end of the cathode can, with the gasket interposed between them, the anode cup has a higher hydrogen over potential material coating layer formed in a limited region on the inside thereof excluding the bottom of the U-shaped fold and the outer periphery of the fold, the cathode can contains the cathode active material and silver-nickelite (AgNiO$_2$), the anode cup contains the anode mix which is mercury-free zinc or zinc alloy powder as the anode active material.

18 Claims, 9 Drawing Sheets

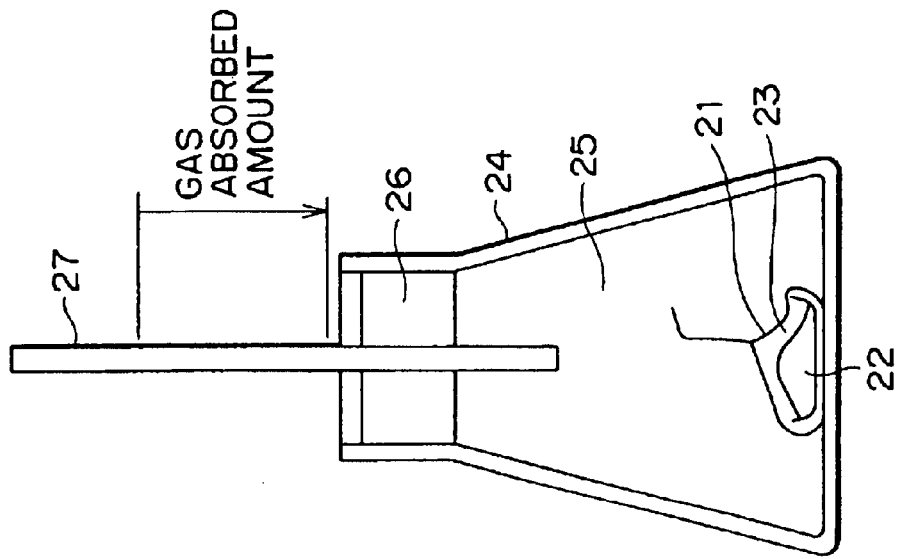
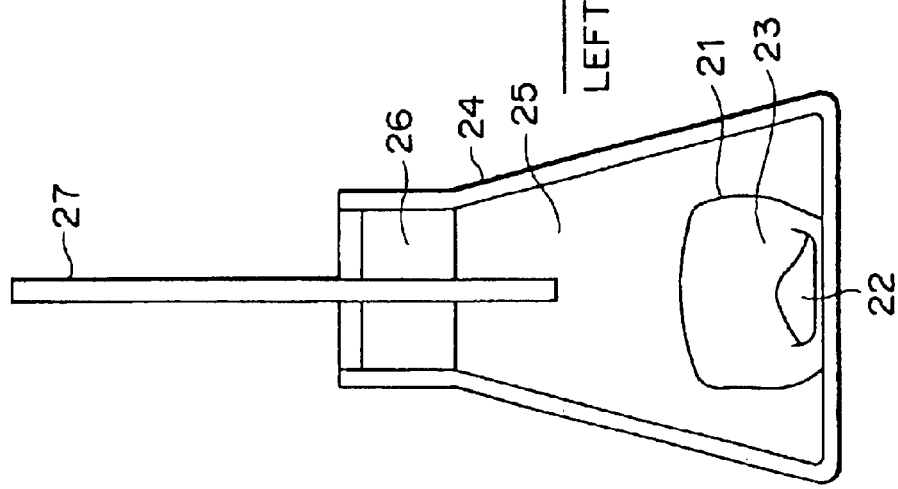

ALKALINE BATTERY

RELATED APPLICATION DATA

The present application claims priority to Japanese Application(s) No(s). P2000-273956 filed Sep. 8, 2000, and P2000-392872 filed Dec. 25, 2000, which application(s) is/are incorporated herein by reference to the extent permitted by law.

BACKGROUND OF THE INVENTION

The present invention relates to an alkaline battery suitable for use as a coin-type alkaline battery or a button-type alkaline battery of flat structure.

Coin-type or button-type alkaline batteries are used for small-sized electronic machines and equipment such as electronic wrist watches and portable electronic computers. As shown in FIG. 4, which is a schematic sectional view, they are constructed such that the open end of a cathode can 1 is sealed with an anode cup 3 with a gasket 2 interposed between them.

The anode cup 3 has its peripheral edge folded back as indicated by a fold 13 which has a U-shape cross section. The fold 13 holds the gasket 2, which is tightened inside by the open end of the cathode can 1, so that hermetical sealing is achieved.

The anode cup 3 is press-formed from a triple-layer laminate plate consisting of an outer surface layer 31 of nickel, a metal layer 32 of stainless steel (SUS), and a current collector layer 33 of copper.

The cathode can 1 holds a cathode mix 4 which contains silver oxide or manganese dioxide as a cathode active material. The anode cup 3 holds an anode mix 6 which contains mercury-free zinc or zinc alloy powder as an anode active material. The anode mix 6 is separated from the cathode mix 4 by a separator 5 and is filled with an alkaline electrolytic solution.

The above-mentioned anode mix 6 may be replaced by amalgamated zinc or zinc alloy powder in order to suppress evolution of hydrogen gas ($H_2$) from zinc powder or zinc alloy powder or evolution of hydrogen gas ($H_2$) from the current collector layer 33 of copper of the anode cup which comes into contact with zinc or zinc alloy powder through the alkaline electrolytic solution. Evolution of hydrogen gas results from the reaction which dissolves zinc or zinc powder in the alkaline electrolytic solution, thereby oxidizing zinc into zinc oxide.

This reaction is suppressed in the case where amalgamated zinc is used. The consequence is the avoidance of capacity deterioration due to hydrogen evolution and leakage and swelling of batteries due to increased internal pressure.

Recently, there is a trend toward avoiding the use of mercury in coin-type or button-type alkaline batteries as far as possible from the environmental point of view, and many research are being made for this purpose.

There have been proposed some methods of suppressing evolution of hydrogen gas from zinc or zinc alloy powder in alkaline electrolytic solution. One involves incorporation of zinc powder with a metal having a high hydrogen overpotential, and the other involves incorporation of the alkaline electrolytic solution with an inhibitor to suppress evolution of hydrogen.

However, none of them can completely suppress the evolution of hydrogen gas which results from zinc or zinc alloy powder coming into contact with the current collector through alkaline electrolytic solution.

It has been suggested that the evolution of hydrogen gas mentioned above is effectively suppressed by coating the copper current collector with any one of tin, indium, and bismuth or an alloy thereof, which has a higher hydrogen overpotential than copper. It has also be proposed that the copper surface of the current collector (anode cup) is coated by plating or the like. This coating, which is accomplished by electroless plating or barrel plating, gives the coating layer 30 shown in FIG. 5. The coating layer 30 is formed over the entire inner surface of the anode cup 3. In other words, the inner fold and the bottom of the fold of the anode cup are also coated with any one or more of tin (Sn), indium (In), and bismuth (Bi).

Incidentally, those corresponding parts in FIGS. 4 and 5 are given the same reference numerals to avoid duplicated explanation.

It has been found that the coating layer 30, which effectively suppresses the evolution of hydrogen gas, is more liable to cause the alkaline electrolytic solution to creep up than the copper layer of current collector. This creeping leads to the possibility of the electrolytic solution leaking out of the seal between the open end of the cathode can 1 and the anode cup 3 when pressure in the battery rises due to evolution of hydrogen gas for one reason or another.

One way to obviate the inconvenience is to form the coating layer 30 in a limited region on the inside of the anode cup 3 excluding the bottom 13a of the U-shaped fold of the anode cup 3 and the outer surface 13b of the U-shaped fold, as shown in FIG. 6.

Although the problem with creeping is solved as mentioned above, there still exists the possibility of hydrogen gas occurring when the coating layer 30 suffers defects such as pinholes, cracks, and contamination with impurities. Such defects permit zinc or zinc alloy to come into electrical contact with the copper of the current collector through the electrolytic solution. Thus this problem is not completely solved by the mercury-free anode structure.

Particularly, the possibility of hydrogen gas occurring is not eliminated in the case where the anode cup is made of a material which has previously been clad with the coating layer 30, because the coating layer 30 is subject to scratching and cracking or contamination with impurities before cladding.

In actual mass production, however, it is difficult to perform partial plating accurately in a limited region on the inside of the anode cup excluding the fold and the bottom of the fold. There is the possibility that the copper surface of the anode cup (current collector) is oxidized by the plating solution during washing.

Even though the metal to suppress the evolution of hydrogen gas ($H_2$) does not exist on the fold and the bottom of the fold of the anode cup, the oxidized cupper surface of the anode cup (current collector) promotes the creeping up of the alkaline electrolytic solution and lowers the leakage resistance.

Difficulties are involved in applying to mass production the technology of preventing the evolution of hydrogen gas ($H_2$) and suppressing the creeping up of the alkaline electrolytic solution.

For the above-mentioned reasons, no mercury-free alkaline batteries of coin type or button type have been put on the general market yet.

SUMMARY OF THE INVENTION

It is an object of the present invention to provide a highly reliable alkaline battery.

To achieve the above object, according to an aspect of the present invention, there is provided an alkaline battery constructed of a cathode can and an anode cup in such a way that an open end of the cathode can is sealed by the anode cup, with a gasket interposed between them, characterized in that the open end of the anode cup is folded back in U-shape along its periphery and the fold is tightened for hermetic sealing by the internal periphery of the open end of the cathode can, with the gasket interposed between them, the anode cup has a tin coating layer formed in a limited region on the inside thereof excluding the bottom of the U-shaped fold and the outer periphery of the fold, the cathode can contains the cathode mix which is silver oxide or manganese dioxide, or other metal oxide as the cathode active material incorporated with silver-nickelite ($AgNiO_2$), the anode cup contains the anode mix which is mercury-free zinc or zinc alloy powder as the anode active material separated from the anode mix by a separator, and the anode mix is impregnated with an alkaline electrolytic solution.

Further, according to an another aspect of the present invention, there is provided an alkaline battery having a cathode can and an anode cup which are hermetically sealed, with a gasket interposed between them, the cathode can holding a cathode mix containing silver oxide or manganese dioxide or other metal oxide as a cathode active material, the anode cup holding an anode mix containing zinc or zinc alloy powder as an anode active material and having a peripheral fold and the bottom of the fold and a copper inside surface, the cathode mix being separated from the anode mix by a separator, and the anode mix being impregnated with an alkaline electrolytic solution, characterized in that a coating film of a metal or an alloy thereof having a higher hydrogen overpotential than copper is formed by dry process in a limited region on the inside surface of the anode cup excluding the fold and the bottom of the fold.

BRIEF DESCRIPTION OF THE DRAWINGS

FIGS. 3A and 3B are diagrams illustrating the method of testing absorption of hydrogen gas;

DESCRIPTION OF THE PREFERRED EMBODIMENTS

Figure 1:
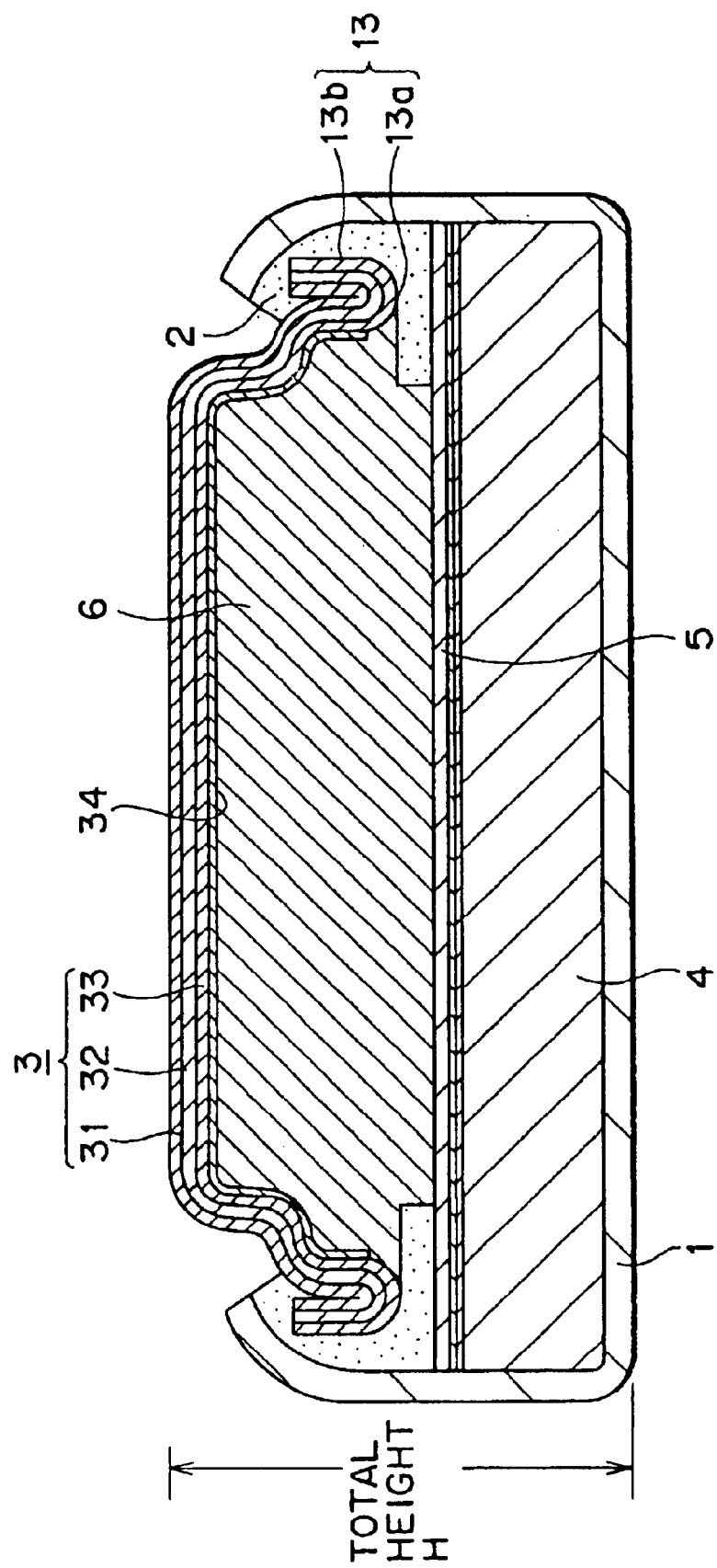
FIG. 1 is a schematic sectional view showing one example of the alkaline battery according to the present invention.

The alkaline battery according to the present invention is constructed such that the open end of the cathode can is sealed by the anode cup, with a gasket interposed between them. The anode cup has its open end folded back along the periphery so that the fold has a U-shape cross section. This fold is tightened by the peripheral inside of the open end of the cathode can, with a gasket interposed between them, so that hermetical sealing is achieved. The anode cup has a tin coating layer formed on its inside excluding the bottom of the U-shape of the fold and the outer periphery of the fold. The cathode can contains a cathode mix which is silver oxide or manganese dioxide or other metal oxide as a cathode active material incorporated or not incorporated with silver-nickelite ($AgNiO_2$). The anode cup holds the anode mix which contains mercury-free zinc or zinc alloy powder as an anode active material. The anode mix is separated from the cathode mix by the separator and is filled with an alkaline electrolytic solution.

The alkaline battery of the present invention is characterized in that the inside of the anode cup is covered with a tin coating layer having a high hydrogen overpotential so that evolution of hydrogen gas is effectively suppressed. The tin coating layer is not formed on the periphery of the cup (that is, the bottom of U-shape of the fold having a U-shape cross section and the outer periphery of the fold). This structure prevents the creeping up of the electrolytic solution.

The alkaline battery of the present invention is further characterized in that the cathode mix is incorporated or not incorporated with silver-nickelite ($AgNiO_2$), which absorbs hydrogen, thereby preventing the internal pressure from rising, the hydrogen occurring from zinc or zinc alloy powder or upon contact of zinc or zinc alloy with copper of the current collector layer through the alkaline electrolytic solution.

Silver-nickelite has an ability to absorb hydrogen gas which is measured in the following manner. A sample 22 weighing 0.1 g and 20 ml of hydrogen gas 23 are placed in a bag 21 of aluminum-laminated film, and this bag is hermetically sealed and placed in a test container 24, as shown in FIG. 3A. The test container 24 is filled with liquid paraffin 25 and then tightly closed with a stopper 26 through which a measuring tube 27 passes. The amount of the liquid paraffin 25 should be large enough for the level of the liquid paraffin to rise in the measuring tube 27.

The assembly is allowed to stand at 60° C. for 4 hours. The amount of hydrogen gas absorbed by the sample 22 in the bag 21 is indicated by the fall of the level in the measuring tube 27.

This test was performed on various samples, and the following result was obtained.

| Samples (ml/g) | Amount absorbed |
|---|---|
| Silver-nickelite ($AgNiO_2$) | 54.7 |
| Silver oxide ($Ag_2O$) | 6.2 |
| Manganese dioxide ($MnO_2$) | 0.1 |

It is noted from the foregoing result that silver-nickelite is by far superior in hydrogen absorbing ability to silver oxide and manganese dioxide. In addition, silver-nickelite absorbs hydrogen very rapidly.

Presumably, silver-nickelite and silver oxide derive their ability to absorb hydrogen gas from their oxidation reduction reaction with hydrogen gas represented by the following equations.

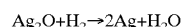

$Ag_2O + H_2 \rightarrow 2Ag + H_2O$

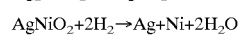

$AgNiO_2 + 2H_2 \rightarrow Ag + Ni + 2H_2O$

No elucidation has been made yet as to why silver-nickelite is much faster than silver oxide in the rate of absorbing hydrogen gas. A probable reason is that nickelite is more active in oxidation reduction reaction with hydrogen gas.

By the way, it is known that silver-nickelite functions as a cathode active material of alkaline batteries and exhibits good conductivity. (Japanese Patent Publication No. Sho 62-11460 and Japanese Patent Laid-open No. Hei 8-171903) In addition, it has been reported that silver-nickelite absorbs hydrogen gas and finds use in cylindrical alkaline batteries. In the present invention, silver-nickelite is used as an additive for the cathode mix, so that it absorbs hydrogen, thereby preventing the internal pressure from increasing, in flat coin-type or button-type batteries in which the active material is held between the cathode can and the anode cup as mentioned above. The inside of the anode cup is partly covered with a tin coating film which prevents the electrolytic solution from creeping up, thereby preventing leakage. The combination of these two effects prevent leakage with certainty. The alkaline battery of the present invention has good leakage resistance. This advantage causes from the fact that silver-nickelite rapidly and efficiently absorbs hydrogen gas even in the case where the tin coating layer has defects such as pinhole, cracks, and contamination with impurities, thereby preventing the internal pressure from increasing, and the tin coating layer prevents the electrolytic solution from creeping.

FIG. 1 is a schematic sectional view showing one embodiment of the flat coin-type or button-type alkaline battery pertaining to the present invention. The alkaline battery is constructed such that the open end of the cathode can 1 is sealed by the anode cup 3, with the gasket 2 interposed between them.

The cathode can 1 is made of stainless steel sheet with nickel plating. It functions also as the cathode terminal. The cathode can 1 holds the cathode mix 4 formed in a coin-like or button-like pellet. The cathode mix 4 is composed of silver oxide or manganese dioxide as a cathode active material and silver-nickelite ($AgNiO_2$) in an amount of 5 to 60 wt %.

The amount of silver-nickelite ($AgNiO_2$) is limited to 5 to 60 wt % because of good hydrogen absorbing effect and forming easily cathode pellet. In other words, an amount less than 5 wt % is not enough for silver-nickelite ($AgNiO_2$) to readily absorb hydrogen to prevent the internal pressure from increasing when hydrogen gas occurs in the battery. By contrast, an amount in excess of 60 wt % presents difficulties in pressure molding, which reduce cathode pellet productivity. The active material is silver oxide ($Ag_2O$) or manganese dioxide ($MnO_2$) or a mixture thereof.

The cathode mix 4 held in the cathode can 1 is covered with the separator 5. The separator 5 may be a triple-layer laminate composed of non-woven fabric, cellophane, and polyethylene. The separator 5 is impregnated with the alkaline electrolytic solution. The alkaline electrolytic solution can be an aqueous solution of sodium hydroxide or potassium hydroxide.

The ring gasket 2 of nylon is arranged on the inside of the open end of the cathode can 1. The anode mix 6 is placed on the separator 5 within the gasket 2. The anode mix 6 is a gel-like substance composed of a mercury-free zinc or zinc alloy powder, an alkaline electrolytic solution, and a thickener.

The anode cup 3 is inserted into the open end of the cathode can 1 such that the anode cup 3 holds the anode mix 6. The anode cup 3 has its open end folded back such that the fold 13 has a U-shape cross section. The open end of the cathode can 1 is tightened against the fold 13, with the gasket 2 interposed between them, so that hermetical sealing is achieved.

The anode cup 3 is press-formed from a triple-layered metal sheet composed of a nickel outer layer 31, a stainless steel layer 32, and a copper layer as current collector layer 33, with the copper layer coated by plating (or vapor deposition or sputtering) with a tin coating layer 34 which has a higher hydrogen overpotential than copper. Pressing is performed such that the tin coating layer 34 becomes inside.

The tin coating layer 34 may also be formed by dropping an electroless plating solution of tin in the cup after the cup has been press-formed from the triple-layered metal sheet. Similarly, the tin coating layer 34 may be formed by vapor deposition of sputtering after the cup has been press-formed.

The tin coating layer 34 is formed in a limited region on the inside of the anode cup 3, excluding the bottom 13a of the U-shape of the fold 13 of the anode cup 3 and the peripheral surface of the fold 13b. This object may be achieved by making the coating layer in the limited region or making the coating layer over the entire surface and then removing the unnecessary part by etching.

The thickness of the tin coating layer 34 should be 0.15 to 100 μm. The tin coating layer 34 thinner than 0.15 μm is liable to suffer pinholes which decrease reliability. The tin coating layer 34 thicker than 100 μm takes a long time and high cost for its production and reduces the battery volume without additional advantages.

The invention will be described with reference to the following examples.

EXAMPLE 1

Figure 2:
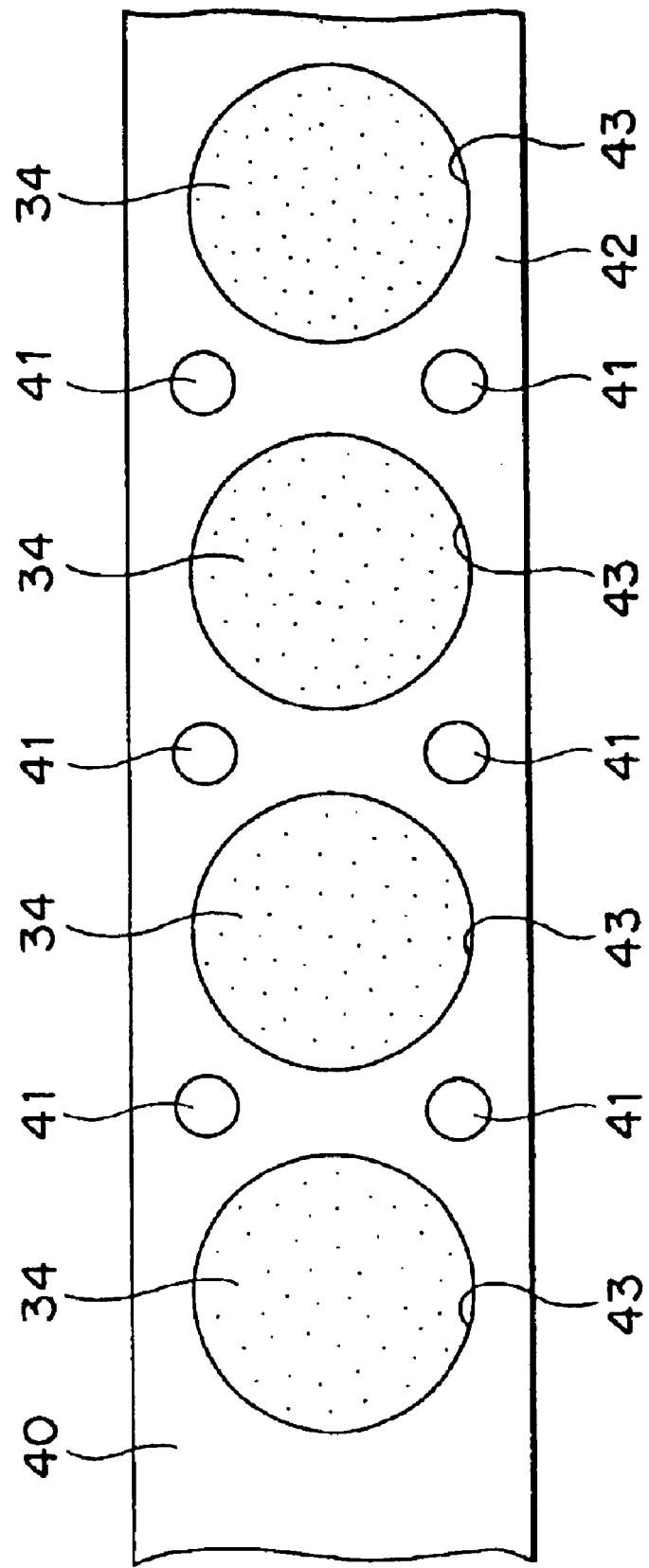
FIG. 2 is a plan view showing one step in the production of the alkaline battery according to the present invention.
Figure 4:
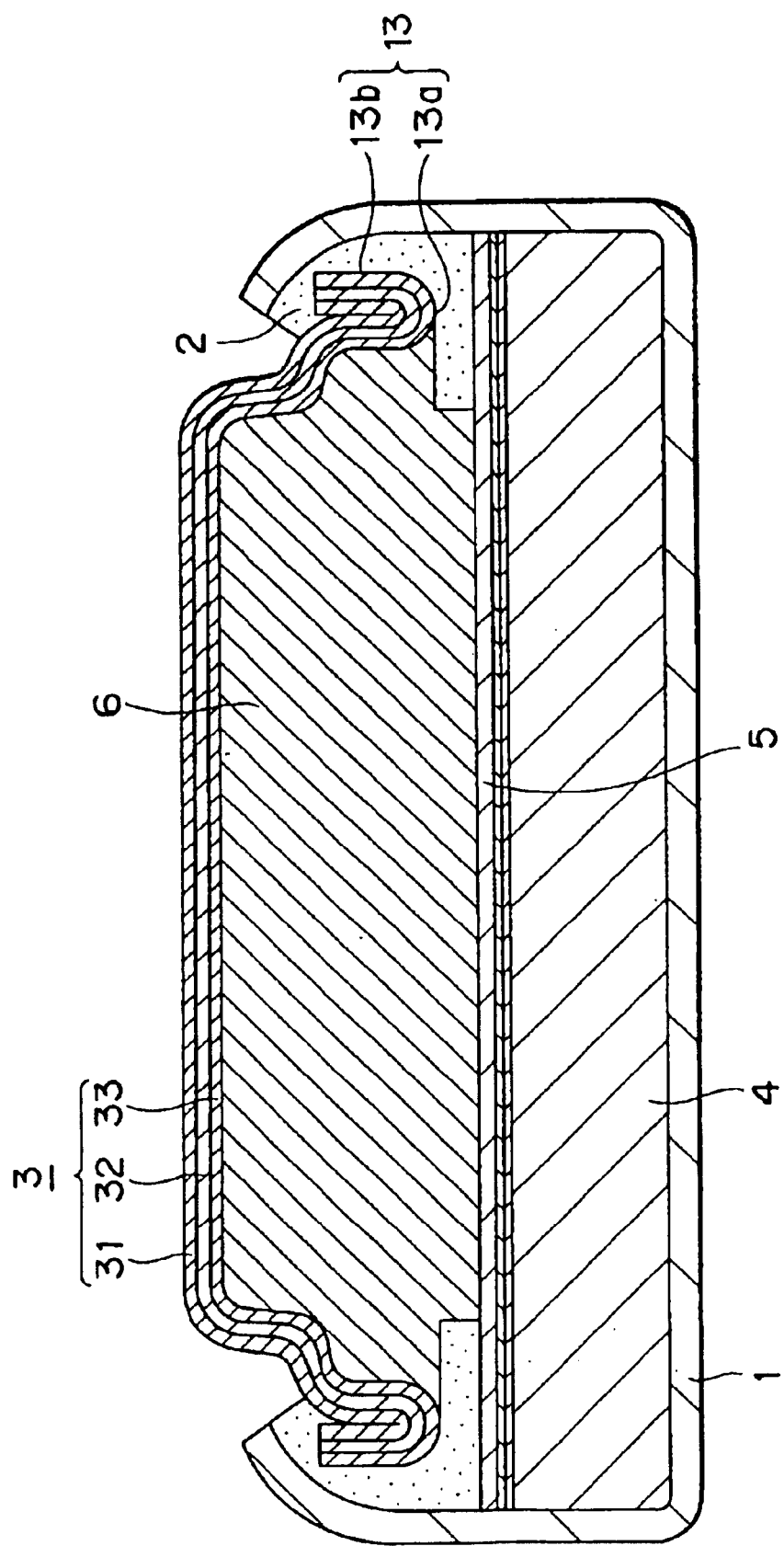
FIG. 4 is a schematic sectional view of a conventional alkaline battery.
Figure 5:
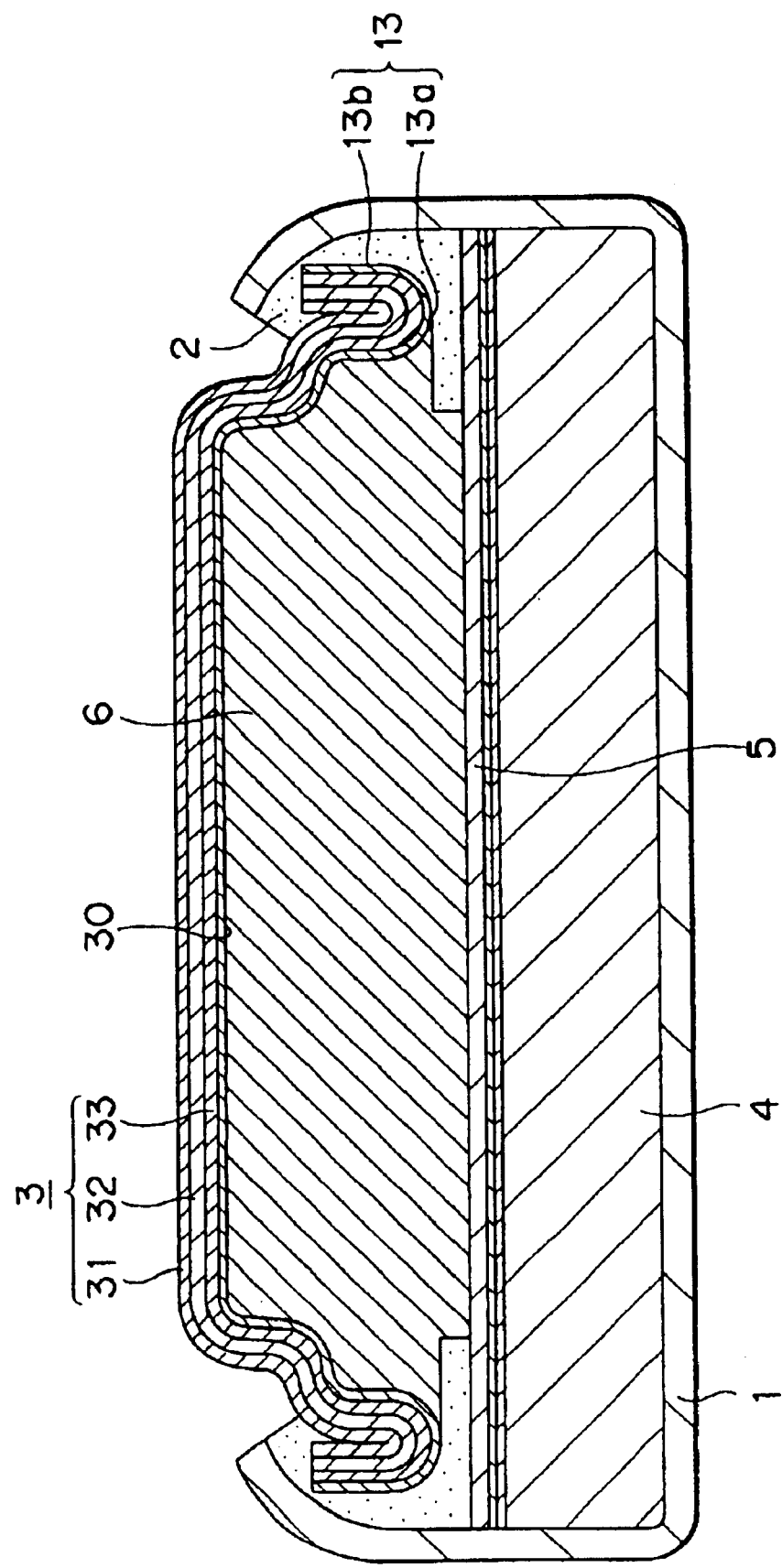
FIG. 5 is a schematic sectional view of a conventional alkaline battery.
Figure 6:
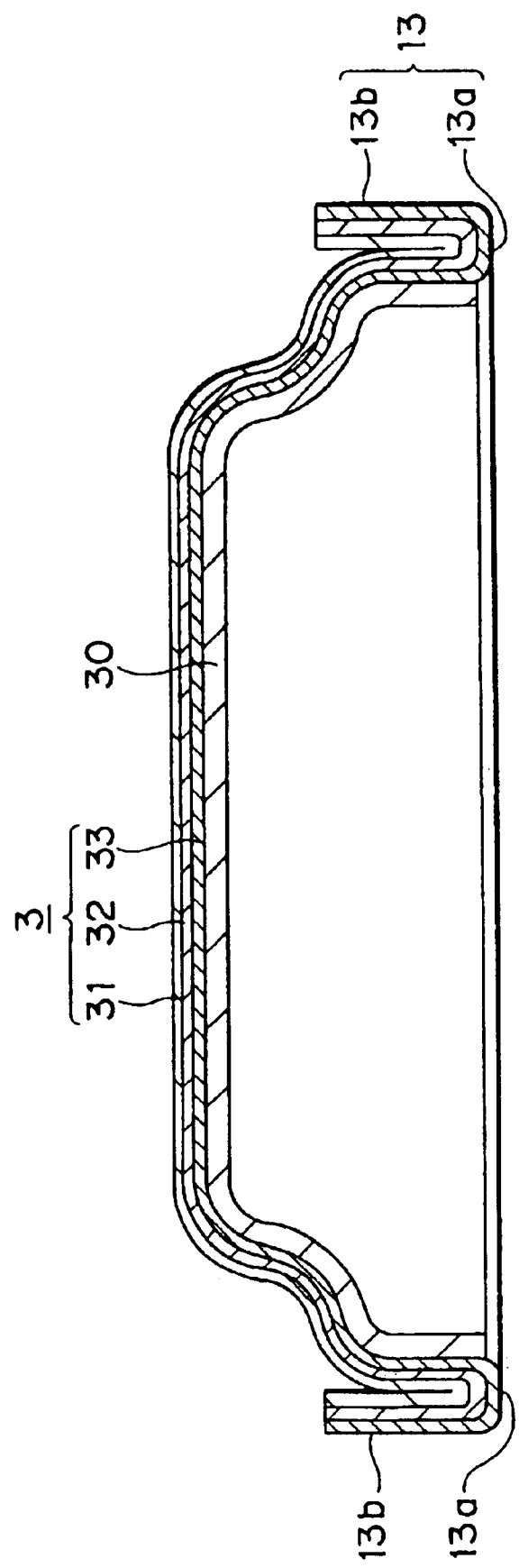
FIG. 6 is a schematic sectional view showing the anode cup of the alkaline battery which is referenced in the description of the present invention.

This example demonstrates an SR626SW battery constructed as shown in FIG. 1. First, the triple-layered metal sheet 40 (0.2 mm thick) was prepared which is composed of the nickel outer layer 31, the metal layer 32 of stainless steel (SUS 304), and the current collector layer 33 of copper, as shown in FIG. 2. Aligning holes 41 were formed in this layered metal sheet 40 to facilitate positioning at the time of making openings in a masking tape which will be described later and press-forming the anode cup.

The masking tape 42 was stuck to the current collector layer 33 of copper of the layered metal sheet 40. The openings 43 (5.5 mm in diameter) were formed at intervals of 9 mm in the masking tape 42. That part of the current collector layer 33 of the layered metal sheet 40 which is exposed through the opening 43 in the masking tape 42 was electrolytically plated with tin, so that the circular tin coating layer 34 (0.15 μm thick) was formed.

Plating was followed by washing with pure water and air drying. The masking tape 42 was peeled off, and finish cleaning and ensuing drying were performed. Thus the tin coating layers 34 were formed at regularly spaced positions on the current collector layer 33 of the layered metal sheet 40.

That part of the layered metal sheet 40 on which the tin coating layer 34 had been formed was punched off by pressing. Thus there was obtained the anode cup 3 which has the fold 13 formed on its periphery and the tin coating layer 34 formed on its inside excluding the bottom 13a of the U-shape of the fold and the outside of the peripheral fold 13b, as shown in FIG. 1.

Into the cathode can 1 (mentioned above) was poured an alkaline electrolytic solution (28 wt % aqueous solution of sodium hydroxide) and a disk-like pellet of the cathode mix 4, so that the cathode mix absorbs the electrolytic solution. The cathode mix 4 is composed of 10 wt % silver-nickelite ($AgNiO_2$), 69.5 wt % silver oxide ($Ag_2O$), 20 wt % manganese dioxide ($MnO_2$), and 0.5 wt % polytetrafluoroethylene (PTFE) as a binder.

On the pellet of the cathode mix 1 was placed the circular separator 5 which had been punched off from a triple-layer laminate of non-woven fabric, cellophane, and polyethylene. The separator 5 was impregnated with an alkaline electrolytic solution (28 wt % aqueous solution of sodium hydroxide) which was added dropwise.

On the separator 5 was placed the anode active material 6, which is a gel-like substance composed of a mercury-free zinc alloy powder containing aluminum, indium, and bismuth, a thickener, and an aqueous solution of sodium hydroxide. The anode cup 3 was inserted into the open end of the cathode can 1 such that it covered the anode active material 6, with the ring gasket 2 (made of nylon-66 and coated with nylon-610) interposed between them. The opening was hermetically sealed by swaging. In this way there was obtained the desired alkaline battery.

EXAMPLE 2

In this example, alkaline batteries were prepared in the same procedure as in Example 1, except that the electrolytically plated tin coating layer 34 has a thickness of 0.86 μm.

EXAMPLE 3

In this example, alkaline batteries were prepared in the same procedure as in Example 1, except that the electrolytically plated tin coating layer 34 has a thickness of 1.55 μm.

EXAMPLE 4

In this example, alkaline batteries were prepared in the same procedure as in Example 1, except that the electrolytically plated tin coating layer 34 has a thickness of 4.25 μm.

EXAMPLE 5

In this example, alkaline batteries were prepared in the same procedure as in Example 1, except that the tin coating layer 34 was formed by electroless plating and had a thickness of 0.15 μm. This electroless tin plating was carried out at 25° C. for 10 minutes. The plating step was followed by rinsing with tap water for 5 minutes, immersion in ethanol for 2 minutes, and drying at 60° C. for 15 minutes.

EXAMPLE 6

In this example, alkaline batteries were prepared in the same procedure as in Example 1, except that the tin coating layer 34 was formed by vacuum sputtering and had a thickness of 0.15 μm.

EXAMPLE 7

In this example, alkaline batteries were prepared in the same procedure as in Example 1, except that the tin coating layer 34 was formed by vacuum sputtering and had a thickness of 0.30 μm.

COMPARATIVE EXAMPLE 1

In this example, alkaline batteries were prepared in the same procedure as in Example 1, except that the inside of the anode cup was not coated with the coating layer having a higher hydrogen overpotential than copper.

COMPARATIVE EXAMPLE 2

In this example, alkaline batteries were prepared in the same procedure as in Example 1, except that the tin coating layer 34 was formed by electroless plating over the entire surface of the current collector layer 33 of the anode cup 3 (including the bottom 13a of the U-shape of the fold 13 and the outside of the peripheral fold 13b).

Twenty each of the alkaline batteries prepared in Examples 1 to 7 and Comparative Examples 1 and 2 mentioned above were stored under severe environment in an oven at 45° C. and 93% RH. They were examined for leakage after storage for 100, 120, 140, and 160 days. The results are shown in Table 1.

TABLE 1

| | | Thickness of tin coating layer (μm) | Composition of cathode mix (wt %) | | | | Ratio of occurrence of leakage Ratio of leakage (%) | | | |
|---|---|---|---|---|---|---|---|---|---|---|
| | Coating method | | AgNiO$_2$ | Ag$_2$O | MnO$_2$ | PTFE | After 100 days | After 120 days | After 140 days | After 160 days |
| Example 1 | Electrolytic plating | 0.15 | 10 | 69.5 | 20 | 0.5 | 0 | 0 | 0 | 5 |
| Example 2 | Electrolytic plating | 0.86 | 10 | 69.5 | 20 | 0.5 | 0 | 0 | 0 | 5 |
| Example 3 | Electrolytic plating | 1.55 | 10 | 69.5 | 20 | 0.5 | 0 | 0 | 0 | 5 |
| Example 4 | Electrolytic plating | 4.25 | 10 | 69.5 | 20 | 0.5 | 0 | 0 | 0 | 5 |
| Example 5 | Electroless plating | 0.15 | 10 | 69.5 | 20 | 0.5 | 0 | 0 | 0 | 5 |
| Example 6 | Sputtering | 0.15 | 10 | 69.5 | 20 | 0.5 | 0 | 0 | 0 | 5 |
| Example 7 | Sputtering | 0.30 | 10 | 69.5 | 20 | 0.5 | 0 | 0 | 0 | 5 |
| Comparative Example 1 | None | — | 10 | 69.5 | 20 | 0.5 | 0 | 10 | 30 | 85 |
| Comparative Example 2 | Electroless plating on entire surface | 0.15 | 10 | 69.5 | 20 | 0.5 | 0 | 0 | 15 | 55 |

Stored at 45° C. and 93% RH

It is apparent from Table 1 that the samples in Examples 1 to 7 caused no leakage at all even after storage for 140 days despite the fact that they do not contain mercury. Only 5% of them caused leakage after storage for 160 days. By contrast, the samples in Comparative Example 1 caused leakage after storage for 120 days and 85% of them caused leakage after storage for 160 days.

The samples in Comparative Example 2 are better than those in Comparative Example 1 in leakage resistance, but they began to cause leakage after storage for 140 days and more than half of them caused leakage after storage for 160 days. The reason why the samples in Examples 1 to 7 have good leakage resistance is that the tin coating layer 34 was formed in the limited region on the inside of the anode cup. Coating in this way prevents the alkaline electrolytic solution from creeping up along the periphery of the anode cup despite the fact that the tin coating layer 34 inherently permits the alkaline electrolytic solution to creep up.

Five samples each in Examples 1 to 7 and Comparative Examples 1 to 2 were tested for discharge capacity. The result obtained by discharging until an end voltage of 1.4V at a load of 30 kΩ is regarded as the initial discharge capacity. They also underwent accelerated test for discharge capacity by storage at 60° C. for 100 days in a dry oven (corresponding to storage for 5 years at normal temperature). The results of the tests are shown in Table 2 in terms of an average value of five samples.

contributes to improvement in discharge capacity as contrasted with the sample in Comparative Example 1 which has no tin coating layer. It seems the reason of above result that the tin coating layer prevents the deterioration of zinc or the evolution of hydrogen, despite the fact that the battery contains no mercury, on account of the action of tin having a higher hydrogen overpotential than copper constituting the current collector layer. However, the sample in Comparative Example 2, which has the tin coating layer over the entire surface of the fold 13 of the anode cup 3, has good discharge capacity but is poor in leakage resistance as shown in Table 1.

The fact that the tin coating layer 34 suppresses the evolution of hydrogen gas is confirmed by measuring change in the overall height H of the battery (or the distance from the bottom of the cathode can 1 to the top of the anode cup). Five samples each in Examples 1 to 7 and Comparative Examples 1 to 2 were measured for change (ΔH) in overall height (H) after storage in an oven at 60° C. for 10 days. The results (in terms of average of five measurements) are shown in Table 3. Incidentally, the overall height of the sample batteries was about 2.6 mm before storage.

TABLE 2

Change in capacity after storage

|  | Coating method | Thickness of tin coating layer (μm) | Composition of cathode mix (wt %) | | | | Capacity (mAh) | |
|---|---|---|---|---|---|---|---|---|
|  |  |  | $AgNiO_2$ | $Ag_2O$ | $MnO_2$ | PTFE | Initial | After storage* |
| Example 1 | Electrolytic plating | 0.15 | 10 | 69.5 | 20 | 0.5 | 28.7 | 19.1 |
| Example 2 | Electrolytic plating | 0.86 | 10 | 69.5 | 20 | 0.5 | 28.9 | 19.2 |
| Example 3 | Electrolytic plating | 1.55 | 10 | 69.5 | 20 | 0.5 | 29.0 | 19.5 |
| Example 4 | Electrolytic plating | 4.27 | 10 | 69.5 | 20 | 0.5 | 28.9 | 19.6 |
| Example 5 | Electroless plating | 0.15 | 10 | 69.5 | 20 | 0.5 | 29.2 | 19.6 |
| Example 6 | Sputtering | 0.15 | 10 | 69.5 | 20 | 0.5 | 29.1 | 19.5 |
| Example 7 | Sputtering | 0.30 | 10 | 69.5 | 20 | 0.5 | 29.3 | 19.7 |
| Comparative Example 1 | None | — | 10 | 69.5 | 20 | 0.5 | 27.1 | 4.5 |
| Comparative Example 2 | Electroless plating on entire surface | 0.15 | 10 | 69.5 | 20 | 0.5 | 29.3 | 19.2 |

*After storage at 60° C. for 100 days

It is noted from Table 2 that those samples having the tin coating layer 34 (with a thickness of 0.15 μm or more)

TABLE 3

Change in overall height

|  | Coating method | Thickness of tin coating layer (μm) | Composition of cathode mix (wt %) | | | | Change (ΔH) in height (mm) after storage at 60° C. for 10 days |
|---|---|---|---|---|---|---|---|
|  |  |  | $AgNiO_2$ | $Ag_2O$ | $MnO_2$ | PTFE |  |
| Example 1 | Electrolytic plating | 0.15 | 10 | 69.5 | 20 | 0.5 | 0.007 |
| Example 2 | Electrolytic plating | 0.86 | 10 | 69.5 | 20 | 0.5 | 0.006 |

TABLE 3-continued

Change in overall height

|  | Coating method | Thickness of tin coating layer (μm) | Composition of cathode mix (wt %) | | | | Change (ΔH) in height (mm) after storage at 60° C. for 10 days |
|---|---|---|---|---|---|---|---|
|  |  |  | AgNiO$_2$ | Ag$_2$O | MnO$_2$ | PTFE |  |
| Example 3 | Electrolytic plating | 1.55 | 10 | 69.5 | 20 | 0.5 | 0.005 |
| Example 4 | Electrolytic plating | 4.27 | 10 | 69.5 | 20 | 0.5 | 0.005 |
| Example 5 | Electroless plating | 0.15 | 10 | 69.5 | 20 | 0.5 | 0.005 |
| Example 6 | Sputtering | 0.15 | 10 | 69.5 | 20 | 0.5 | 0.005 |
| Example 7 | Sputtering | 0.30 | 10 | 69.5 | 20 | 0.5 | 0.005 |
| Comparative Example 1 | None | — | 10 | 69.5 | 20 | 0.5 | 0.047 |
| Comparative Example 2 | Electroless plating on entire surface | 0.15 | 10 | 69.5 | 20 | 0.5 | 0.005 |

Change (ΔH) in height (mm) = Height before storage − Height after storage at 60° C. for 10 days It is apparent from Table 3 that the samples in Comparative Example 1 which have no tin coating layer 34 greatly changed in overall height. This suggests an evolution of hydrogen gas in large amounts.

Next, composition of the cathode mix 4 is changed.

EXAMPLE 8

In this example, alkaline batteries were prepared in the same procedure as in Example 1, except that the cathode mix 4 is composed of 5 wt % silver-nickelite (AgNiO$_2$), 94.5 wt % silver oxide (Ag$_2$O), 0 wt % manganese dioxide (MnO$_2$), and 0.5 wt % polytetrafluoroethylene (PTFE).

EXAMPLE 9

In this example, alkaline batteries were prepared in the same procedure as in Example 1, except that the cathode mix 4 is composed of 10 wt % AgNiO$_2$, 89.5 wt % Ag$_2$O, 0 wt % MnO$_2$, and 0.5 wt % PTFE.

EXAMPLE 10

In this example, alkaline batteries were prepared in the same procedure as in Example 1, except that the cathode mix 4 is composed of 20 wt % AgNiO$_2$, 79.5 wt % Ag$_2$O, 0 wt % MnO$_2$, and 0.5 wt % PTFE.

EXAMPLE 11

In this example, alkaline batteries were prepared in the same procedure as in Example 1, except that the cathode mix 4 is composed of 40 wt % AgNiO$_2$, 59.5 wt % Ag$_2$O, 0 wt % MnO$_2$, and 0.5 wt % PTFE.

EXAMPLE 12

In this example, alkaline batteries were prepared in the same procedure as in Example 1, except that the cathode mix 4 is composed of 60 wt % AgNiO$_2$, 39.5 wt % Ag$_2$O, 0 wt % MnO$_2$, and 0.5 wt % PTFE.

EXAMPLE 13

In this example, alkaline batteries were prepared in the same procedure as in Example 1, except that the cathode mix 4 is composed of 5 wt % AgNiO$_2$, 74.5 wt % Ag$_2$O, 20 wt % MnO$_2$, and 0.5 wt % PTFE.

EXAMPLE 14

In this example, alkaline batteries were prepared in the same procedure as in Example 1, except that the cathode mix 4 is composed of 20 wt % AgNiO$_2$, 59.5 wt % Ag$_2$O, 20 wt % MnO$_2$, and 0.5 wt % PTFE.

EXAMPLE 15

In this example, alkaline batteries were prepared in the same procedure as in Example 1, except that the cathode mix 4 is composed of 40 wt % AgNiO$_2$, 39.5 wt % Ag$_2$O, 20 wt % MnO$_2$, and 0.5 wt % PTFE.

EXAMPLE 16

In this example, alkaline batteries were prepared in the same procedure as in Example 1, except that the cathode mix 4 is composed of 60 wt % AgNiO$_2$, 19.5 wt % Ag$_2$O, 20 wt % MnO$_2$, and 0.5 wt % PTFE.

EXAMPLE 17

In this example, alkaline batteries were prepared in the same procedure as in Example 1, except that the cathode mix 4 is composed of 5 wt % AgNiO$_2$, 0 wt % Ag$_2$O, 94.5 wt % MnO$_2$, and 0.5 wt % PTFE.

EXAMPLE 18

In this example, alkaline batteries were prepared in the same procedure as in Example 1, except that the cathode mix 4 is composed of 10 wt % AgNiO$_2$, 0 wt % Ag$_2$O, 89.5 wt % MnO$_2$, and 0.5 wt % PTFE.

EXAMPLE 19

In this example, alkaline batteries were prepared in the same procedure as in Example 1, except that the cathode mix 4 is composed of 20 wt % AgNiO$_2$, 0 wt % Ag$_2$O, 79.5 wt % MnO$_2$, and 0.5 wt % PTFE.

EXAMPLE 20

In this example, alkaline batteries were prepared in the same procedure as in Example 1, except that the cathode mix 4 is composed of 40 wt % AgNiO$_2$, 0 wt % Ag$_2$O, 59.5 wt % MnO$_2$, and 0.5 wt % PTFE.

EXAMPLE 21

In this example, alkaline batteries were prepared in the same procedure as in Example 1, except that the cathode mix 4 is composed of 60 wt % $AgNiO_2$, 0 wt % $Ag_2O$, 39.5 wt % $MnO_2$, and 0.5 wt % PTFE.

COMPARATIVE EXAMPLE 3

In this example, alkaline batteries were prepared in the same procedure as in Example 1, except that the cathode mix 4 is composed of 0 wt % $AgNiO_2$, 99.5 wt % $Ag_2O$, 0 wt % $MnO_2$, and 0.5 wt % PTFE.

COMPARATIVE EXAMPLE 4

In this example, alkaline batteries were prepared in the same procedure as in Example 1, except that the cathode mix 4 is composed of 3 wt % $AgNiO_2$, 96.5 wt % $Ag_2O$, 0 wt % $MnO_2$, and 0.5 wt % PTFE.

COMPARATIVE EXAMPLE 5

In this example, alkaline batteries were prepared in the same procedure as in Example 1, except that the cathode mix 4 is composed of 0 wt % $AgNiO_2$, 79.5 wt % $Ag_2O$, 20 wt % $MnO_2$, and 0.5 wt % PTFE.

COMPARATIVE EXAMPLE 6

In this example, alkaline batteries were prepared in the same procedure as in Example 1, except that the cathode mix 4 is composed of 3 wt % $AgNiO_2$, 76.5 wt % $Ag_2O$, 20 wt % $MnO_2$, and 0.5 wt % PTFE.

COMPARATIVE EXAMPLE 7

In this example, alkaline batteries were prepared in the same procedure as in Example 1, except that the cathode mix 4 is composed of 0 wt % $AgNiO_2$, 0 wt % $Ag_2O$, 99.5 wt % $MnO_2$, and 0.5 wt % PTFE.

COMPARATIVE EXAMPLE 8

In this example, alkaline batteries were prepared in the same procedure as in Example 1, except that the cathode mix 4 is composed of 3 wt % $AgNiO_2$, 0 wt % $Ag_2O$, 96.5 wt % $MnO_2$, and 0.5 wt % PTFE.

Five each of the alkaline batteries prepared in Examples 8 to 21 and Comparative Examples 3 to 8 mentioned above were stored at 45° C. and 93% RH. They were examined for leakage after storage for 100, 120, 140, and 160 days. The results are shown in Table 4. They were also examined for change ($\Delta H$) in height (H) after storage at 60° C. for 10 days. The results in terms of average of five measurements are shown in Table 4.

TABLE 4

Occurrence of leakage and change in height

| | Composition of cathode mix (wt %) | | | | Ratio of leakage (%) | | | | Change ($\Delta H$) in height (mm) after storage at 60° C. for 10 days |
|---|---|---|---|---|---|---|---|---|---|
| | $AgNiO_2$ | $Ag_2O$ | $MnO_2$ | PTFE | After 100 days | After 120 days | After 140 days | After 160 days | |
| Comparative Example 3 | 0 | 99.5 | 0 | 0.5 | 0 | 0 | 5 | 10 | 0.015 |
| Comparative Example 4 | 3 | 96.5 | 0 | 0.5 | 0 | 0 | 0 | 10 | 0.010 |
| Example 8 | 5 | 94.5 | 0 | 0.5 | 0 | 0 | 0 | 5 | 0.007 |
| Example 9 | 10 | 89.5 | 0 | 0.5 | 0 | 0 | 0 | 5 | 0.006 |
| Example 10 | 20 | 79.5 | 0 | 0.5 | 0 | 0 | 0 | 5 | 0.006 |
| Example 11 | 40 | 59.5 | 0 | 0.5 | 0 | 0 | 0 | 5 | 0.005 |
| Example 12 | 60 | 39.5 | 0 | 0.5 | 0 | 0 | 0 | 5 | 0.005 |
| Comparative Example 5 | 0 | 79.5 | 20 | 0.5 | 0 | 0 | 5 | 15 | 0.016 |
| Comparative Example 6 | 3 | 76.5 | 20 | 0.5 | 0 | 0 | 0 | 10 | 0.011 |
| Example 13 | 5 | 74.5 | 20 | 0.5 | 0 | 0 | 0 | 5 | 0.008 |
| Example 1 | 10 | 69.5 | 20 | 0.5 | 0 | 0 | 0 | 5 | 0.007 |
| Example 14 | 20 | 59.5 | 20 | 0.5 | 0 | 0 | 0 | 5 | 0.006 |
| Example 15 | 40 | 39.5 | 20 | 0.5 | 0 | 0 | 0 | 5 | 0.005 |
| Example 16 | 60 | 19.5 | 20 | 0.5 | 0 | 0 | 0 | 5 | 0.005 |
| Comparative Example 7 | 0 | 0 | 99.5 | 0.5 | 0 | 0 | 5 | 20 | 0.018 |
| Comparative Example 8 | 3 | 0 | 96.5 | 0.5 | 0 | 0 | 0 | 15 | 0.012 |
| Example 17 | 5 | 0 | 94.5 | 0.5 | 0 | 0 | 0 | 5 | 0.008 |
| Example 18 | 10 | 0 | 89.5 | 0.5 | 0 | 0 | 0 | 5 | 0.007 |
| Example 19 | 20 | 0 | 79.5 | 0.5 | 0 | 0 | 0 | 5 | 0.006 |
| Example 20 | 40 | 0 | 59.5 | 0.5 | 0 | 0 | 0 | 5 | 0.005 |
| Example 21 | 60 | 0 | 39.5 | 0.5 | 0 | 0 | 0 | 5 | 0.005 |

Coating by electrolytic plating; 0.15 µm thick; leakage tested after storage at 45° C. and 93% RH It is apparent from Table 4 that those samples whose cathode mix 4 contains more than 5 wt % silver-nickelite less suffer leakage and less change in height.

This is attributable to the silver-nickelite in the cathode mix 4 which rapidly absorbs hydrogen gas evolved by zinc or zinc alloy powder and by contact of zinc or zinc alloy powder with the copper current collector layer 33 through the alkaline electrolytic solution. Absorption of hydrogen gas keeps the internal pressure low and prevents leakage and battery swelling.

As mentioned above, the alkaline battery of the present invention is characterized in that the anode cup 3 has its inside covered with the tin coating layer 34 which has a higher hydrogen overpotential than copper used for the current collector layer 33. It is also characterized in that the tin coating layer 34 is formed in the limited region on the inside excluding the bottom 13a of the U-shaped fold 13 of the anode cup 3 and the peripheral outside 13b of the fold. The first feature suppresses the evolution of hydrogen gas, and the second feature prevents the electrolytic solution from creeping up and hence improves leakage resistance.

Moreover, the alkaline battery of the present invention is characterized in that the cathode mix 4 contains silver-nickelite (5 wt % or more), which absorbs hydrogen gas which might occur when the tin coating layer 34 on the anode cup 3 has defects (such as pinholes, scratches, cracks, and contamination with impurities) or when zinc or zinc alloy powder comes into contact with the current collector layer 33 through the alkaline electrolytic solution. Absorption of hydrogen gas prevents the internal pressure from increasing. The foregoing features lead to reliable button-type or coin-type alkaline batteries which are free from leakage and swelling.

Figure 7:
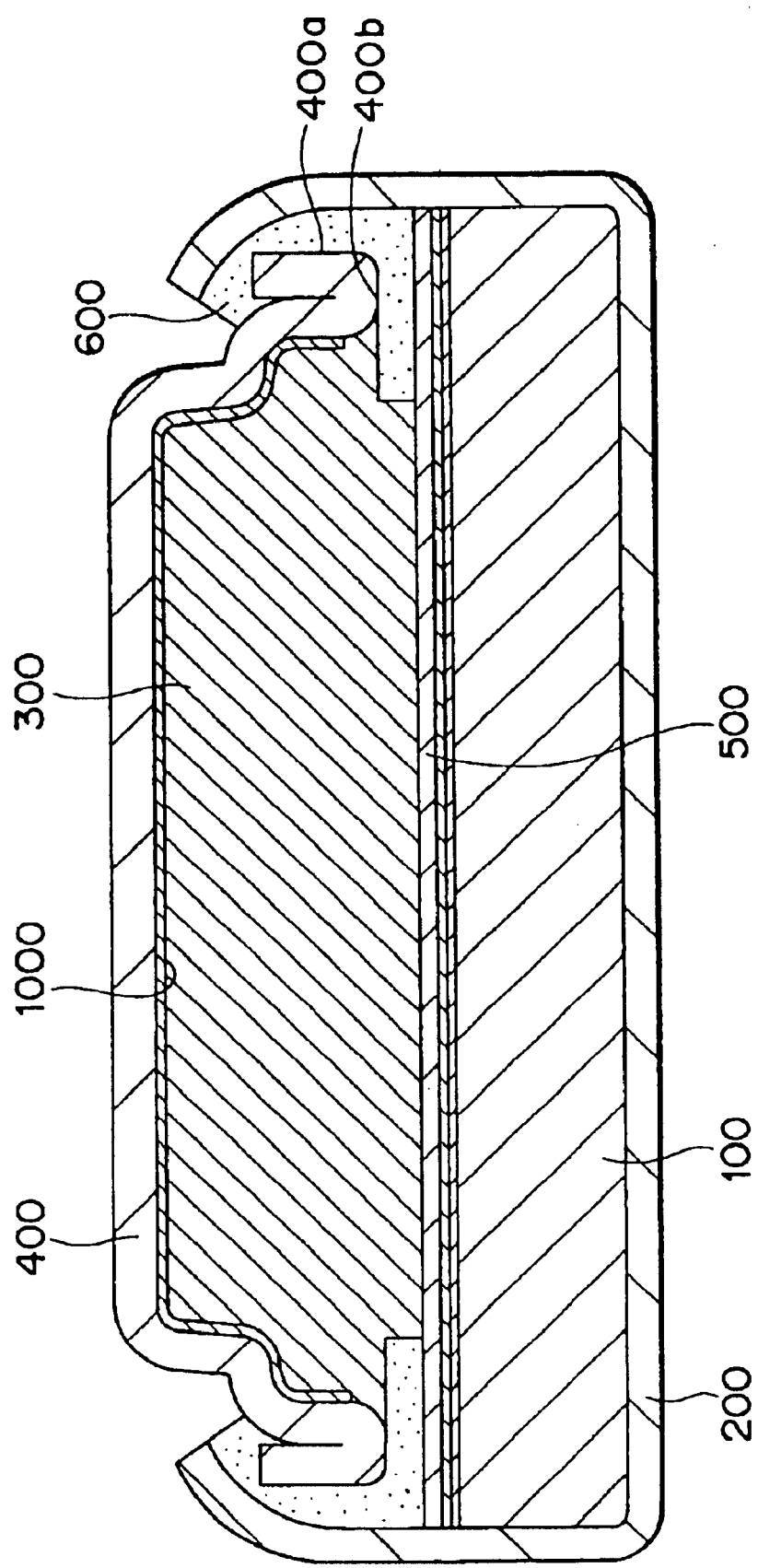
FIG. 7 is a sectional view showing one embodiment of the alkaline battery according to the present invention.

In FIG. 7, there is shown a cathode mix 100 which contains silver oxide or manganese dioxide as the cathode active material. In this embodiment, the cathode mix 100 is formed into a coin-like pellet. The cathode mix 100 in the form of coin-like pellet is placed in the cathode can 200 which functions as the cathode terminal and the cathode current collector and is formed from a nickel-plated stainless steel sheet.

There is also shown an anode mix 300 which contains zinc or zinc alloy powder as the anode active material. The anode mix 300 is a mercury-free gel-like substance compounded with an alkaline electrolytic solution (such as an aqueous solution of sodium hydroxide or potassium hydroxide) and a thickener. The anode mix 300 is placed in the anode cup 400 which functions as the anode terminal and the anode current collector.

There is shown a separator 500 between the cathode mix 100 and the anode mix 300, which is a triple-layer laminate composed of non-woven fabric, cellophane, and polyethylene. The separator 500 is impregnated with the alkaline electrolytic solution, such as an aqueous solution of sodium hydroxide or potassium hydroxide.

There is shown a nylon gasket 600 inside the periphery of the cathode can 200 and between the upper surface of the separator 500 and the fold 400a and the bottom 400b of the fold 400a of the outer periphery of the anode cup 400. The cathode can 200 and the anode cup 400 are hermetically sealed by crimping.

Figure 8:
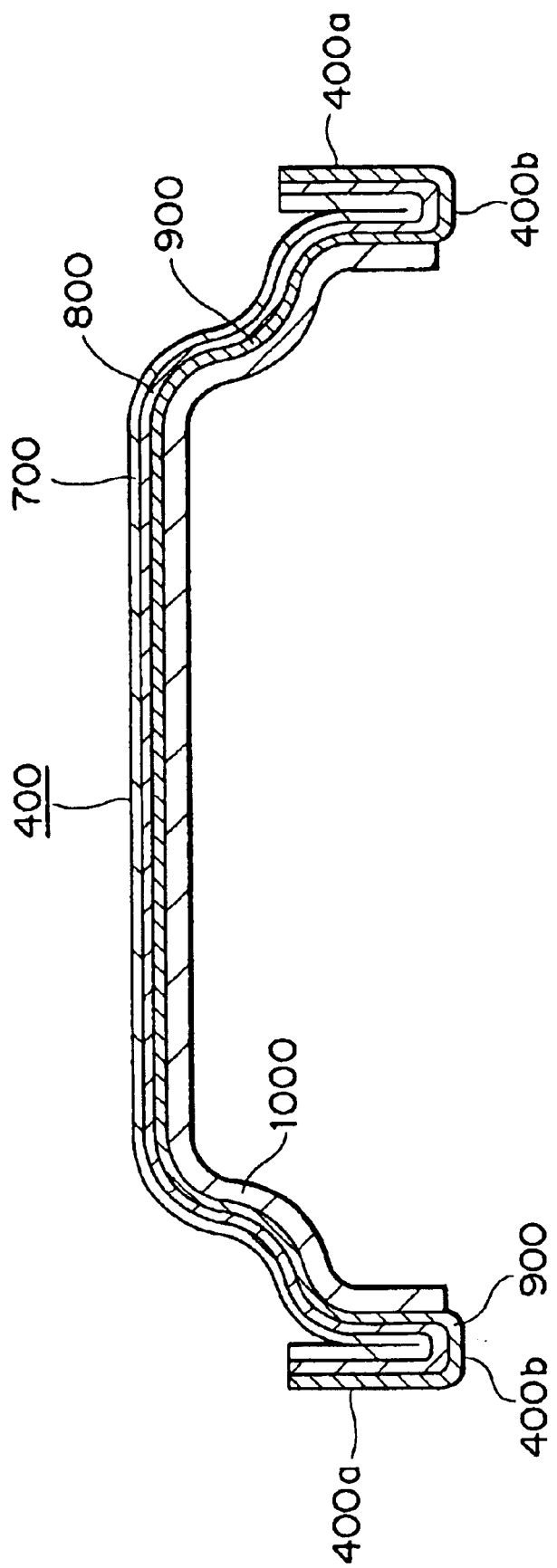
FIG. 8 is a sectional view of the anode cup in the alkaline battery shown in FIG. 7.

In this embodiment, the anode cup 400 is formed from a triple-layered metal sheet composed of nickel 700, stainless steel 800, and copper 900. It has the fold 400a and the bottom 400b of the fold 400a as shown in FIG. 8.

In this embodiment, a tin coating layer 1000 is formed by dry process (sputtering) in a limited region on the inside surface of the anode cup 400 excluding the fold 400a and the bottom 400b of the fold 400a.

The advantage of this embodiment is the avoidance of evolution of hydrogen gas and the preservation of good leakage resistance as demonstrated by Examples 1 to 6 shown in Table 5. This is because the tin coating layer 1000 having a higher hydrogen overpotential than copper formed by sputtering (dry process) on the inside surface of the anode cup 400 prevents the evolution of hydrogen gas ($H_2$), and the copper surface 900 remaining uncoated on the fold 400a and the bottom 400b of the fold 400a of the anode cup 400 permits the alkaline electrolytic solution to creep up through the seal of the gasket 600 less than the tin coating layer 1000 and the surface of the copper 900 as the matrix of the fold 400a and the bottom 400b of the fold 400a of the anode cup 400 is not oxidized.

TABLE 5

| | Occurrence of leakage after storage at 45° C., 93% RH (%) | | | | Capacity after storage at 60° C. (mAh) | |
|---|---|---|---|---|---|---|
| | 100 days | 120 days | 140 days | 160 days | Initial | 100 days |
| Example 1 | 0 | 0 | 0 | 10 | 29.2 | 19.0 |
| Example 2 | 0 | 0 | 0 | 9 | 29.1 | 19.5 |
| Example 3 | 0 | 0 | 0 | 8 | 29.3 | 19.7 |
| Example 4 | 0 | 0 | 0 | 12 | 28.0 | 18.6 |
| Example 5 | 0 | 0 | 0 | 12 | 28.5 | 18.8 |
| Example 6 | 0 | 0 | 0 | 10 | 29.0 | 19.0 |
| Comparative Example 1 | 0 | 0 | 0 | 13 | 29.2 | 19.6 |
| Comparative Example 2 | 0 | 10 | 30 | 85 | 27.1 | 4.5 |

The alkaline battery (such as SR626SW) in Example 1 has the anode cup 400 which is press-formed from a 0.2 mm thick triple-layered metal sheet consisting of nickel 700, stainless steel 800, and copper 900, as shown in FIG. 8.

Figure 9:
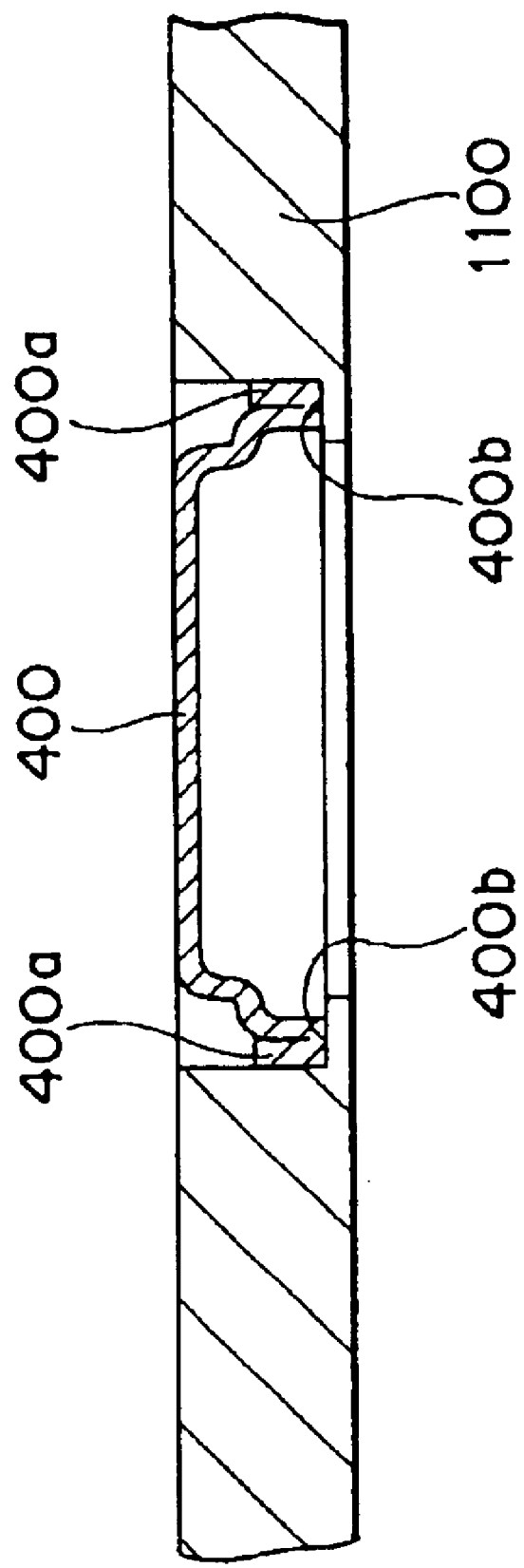
FIG. 9 is a schematic diagram illustrating important parts in the present invention.

This anode cup 400 is placed in a previously prepared mask 1100 as shown in FIG. 9. This mask hides the fold 400a and the bottom 400b of the fold 400a of the anode cup 400. The anode cup 400 undergoes sputtering so that the tin coating layer 1000 (0.01 μm thick) is formed on the inside thereof. In Example 1, the thus obtained anode cup 400 was used to make the button-type alkaline battery shown in FIG. 7.

The cathode can 200 shown in FIG. 7 is filled with an alkaline electrolytic solution (28 wt % aqueous solution of sodium hydroxide) and a coin-like pellet of the cathode mix 100, so that the cathode mix absorbs the electrolytic solution. The cathode mix 100 is composed of silver oxide, manganese dioxide, and polytetrafluoroethylene.

On the pellet of the cathode mix 100 is placed the circular separator 500 which has been punched off from a triple-layer laminate of non-woven fabric, cellophane, and polyethylene. On the separator 500 is placed the gasket 600 of nylon-66 coated with nylon-610.

The non-woven fabric of the separator 500 is impregnated with an alkaline electrolytic solution (28 wt % aqueous solution of sodium hydroxide) which is added dropwise. On the non-woven fabric of the separator 500 is placed the anode mix 300, which is a gel-like substance composed of a mercury-free zinc alloy powder containing aluminum, indium, and bismuth, a thickener, and an aqueous solution of sodium hydroxide. The anode cup 400 is placed on the anode mix 300 and then crimped by swaging. In this way there was obtained the desired alkaline battery (SR 626 SW) in Example 1.

In Example 2 shown in FIG. 7, the anode cup 400 undergoes sputtering in the same way as in Example 1, so that the tin coating layer 1000 (0.15 μm thick) is formed in the limited region on the inside thereof excluding the fold 400a and the bottom 400b of the fold 400a. In Example 2, the thus obtained anode cup 400 was used to make the button-type alkaline battery (SR626SW) in the same way as in Example 1.

In Example 3, the anode cup 400 undergoes sputtering in the same way as in Example 1, so that the tin coating layer 1000 (1.50 μm thick) is formed in the limited region on the inside thereof excluding the fold 400a and the bottom 400b of the fold 400a. In Example 3, the thus obtained anode cup 400 was used to make the button-type alkaline battery (SR626SW) in the same way as in Example 1.

In Example 4, the anode cup 400 undergoes vacuum deposition through the mask 1100 placed thereon in the same way as in Example 1, so that the tin coating layer 1000 (0.01 μm thick) is formed in the limited region on the inside thereof. In Example 4, the thus obtained anode cup 400 was used to make the button-type alkaline battery (SR626SW) in the same way as in Example 1.

In Example 5, the anode cup 400 undergoes vacuum deposition as dry film forming method through the mask 1100 placed thereon in the same way as in Example 1, so that the tin coating layer 1000 (0.15 μm thick) is formed in the limited region on the inside thereof. In Example 5, the thus obtained anode cup 400 was used to make the button-type alkaline battery (SR626SW) in the same way as in Example 1.

In Example 6, the anode cup 400 undergoes vacuum deposition through the mask 1100 placed thereon in the same way as in Example 1, so that the tin coating layer 1000 (1.50 μm thick) is formed in the limited region on the inside thereof. In Example 6, the thus obtained anode cup 400 was used to make the button-type alkaline battery (SR626SW) in the same way as in Example 1.

In Comparative Example 1, the anode cup 400 undergoes electroless plating with tin so that the tin coating layer 1000 (0.15 μm thick) is formed in the limited region on the inside thereof excluding the fold 400a and the bottom 400b of the fold 400a. The thus obtained anode cup 400 was used to make the button-type alkaline battery (SR626SW) in the same way as in Example 1.

In Comparative Example 2, the anode cup 400 is not provided with the tin coating layer. The anode cup 400 was used to make the button-type alkaline battery (SR626SW) in the same way as in Example 1.

Two hundred each of the alkaline batteries prepared in Examples 1 to 6 and Comparative Examples 1 and 2 mentioned above were stored at 45° C. and 93% RH. They were examined for leakage after storage for 100, 120, 140, and 160 days.

It is noted from Table 5 that those alkaline batteries in Examples 1 to 6 are less liable to leakage than those alkaline batteries in Comparative Example 1 when they are stored at 45° C. and 93% RH.

The reason that those alkaline batteries in Examples 1 to 6 do not permit the alkaline electrolytic solution to creep up is because they have no oxide film on the fold 400a and the bottom 400b of the fold 400a of the anode cup 400.

Five samples each in Examples 1 to 6 and Comparative Examples 1 to 2 were tested for discharge capacity. The initial discharge capacity was measured by discharging until an end voltage of 1.4V at a load of 30 kΩ. They were also tested for discharge capacity after storage at 60° C. for 100 days.

It is noted from Table 5 that those alkaline batteries in Examples 1 to 6 are superior in discharge capacity to those alkaline batteries in Comparative Example 2 when they are stored at 60° C. for 100 days. It is also noted that those alkaline batteries in Examples 1 and 4 are comparable to or superior to those alkaline batteries in Comparative Example 1 in discharge capacity when they are stored at 60° C. for 100 days. These results suggest that the tin coating layer 1000 to be formed on the anode cup 400 by dry process should be no thinner than 0.01 μm.

The alkaline batteries in Examples are exempt from evolution of hydrogen gas ($H_2$) owing to the tin coating layer 1000 having a higher hydrogen overpotential than copper which is formed by dry process on the inside of the anode cup 400. Moreover, they have good leakage resistance because the tin coating layer is formed in such a way that the copper surface 900 (which permits the alkaline electrolytic solution to creep up at the seal of the gasket more easily than the tin coating layer) remains uncovered on the fold 400a and the bottom 400b of the fold 400a of the anode cup 400 and the oxide coating film of copper as the matrix is not formed on the fold 400a and the bottom 400b of the fold 400a of the anode cup 400.

In other words, the alkaline batteries of the present invention are exempt from leakage, swelling, and bursting because the tin coating film 100 (which prevents evolution of hydrogen gas without resort to mercury) is formed by dry process in the region excluding the fold 400a and the bottom 400b of the fold 400a of the anode cup 400 and the oxide film of copper as the matrix is formed on the fold 400a and the bottom 400b of the fold 400a of the anode cup 400.

The above-mentioned Examples employed sputtering or vacuum deposition as the dry film-forming process. The dry process further includes PVD (physical vapor deposition) such as ion plating and CVD (chemical vapor deposition) that uses heat, plasma, light, etc.

The above-mentioned Examples employed tin as the metal having a higher hydrogen potential than copper. Tin may be replaced by more than one species of tin (Sn), indium (In), and bismuth (Bi) in combination or by an alloy thereof.

The present invention is not limited to those batteries shown in the above-mentioned Examples, but it may be applied to batteries of other types.

It is understood that various changes and modifications may be made in the invention without departing from the spirit and scope thereof.

While the preferred embodiment of the present invention has been described using the specific terms, such description is for illustrative purposes only, and it is to be understood that changes and variations may be made without departing from the spirit or scope of the following claims.

What is claimed is:

1. An alkaline battery constructed of a cathode can and an anode cup in such a way that an open end of the cathode can is sealed by the anode cup, with a gasket interposed between the cathode can and the anode cup, wherein said alkaline battery comprises the open end of the anode cup is folded back in U-shape along its periphery and the fold is tightened for hermetic sealing by the internal periphery of the open end of the cathode can, with the gasket interposed between them, the anode cup has a tin coating layer formed in a limited region on the inside thereof excluding the bottom of the U-shaped fold and the outer periphery of the fold, the cathode can contains a cathode mix which contain silver oxide or manganese dioxide as the cathode active material incorporated with silver-nickelite ($AgNiO_2$), the anode cup contains an anode mix which is mercury-free zinc or zinc alloy powder as the anode active material separated from the cathode mix by a separator, and the anode mix is impregnated with an alkaline electrolytic solution.

2. An alkaline battery as claimed in claim 1, wherein said silver-nickelite of the cathode mix comprises in an amount not less than 5 wt % to not more than 60 wt %.

3. An alkaline battery as claimed in claim 1 wherein said tin coating layer has a thickness not smaller than 0.15 μm.

4. An alkaline battery as claimed in claim 1, wherein the anode cup is press-formed from a metal sheet having a tin-plated layer which functions as the tin coating layer.

5. An alkaline battery as claimed in claim 1, wherein the anode cup is press-formed from a metal sheet and subsequently has its inside coated with the tin coating layer by electroless plating with a tin plating solution.

6. An alkaline battery having a cathode can and an anode cup which are hermetically sealed, with a gasket interposed between the cathode can and the anode cup, wherein said cathode can contains a cathode mix comprising silver oxide or manganese dioxide as a cathode active material, said anode cup contains an anode mix containing zinc or zinc alloy powder without mercury added as an anode active material and said anode cup has a peripheral fold and a copper inside surface, said cathode mix being separated from said anode mix by a separator, and the anode mix being impregnated with an alkaline electrolytic solution, wherein said alkaline battery comprises:

a coating film having a higher hydrogen overpotential than copper formed on the inside surface of said anode cup and not on an outer periphery and a bottom of the fold.

7. An alkaline battery as claimed in claim 6, wherein the film-forming dry process is Physical Vapor Deposition including vacuum deposition, sputtering, and ion plating, or Chemical Vapor Deposition with heat, plasma, or light.

8. An alkaline battery as claimed in claim 6, wherein the film of a metal or an alloy thereof having a higher hydrogen overpotential than copper has a thickness not smaller than 0.01 $\mu$m.

9. An alkaline battery as claimed in claim 6, wherein the metal or an alloy thereof having a higher hydrogen overpotential than copper is at least one species of tin, indium, and bismuth or an alloy thereof.

10. An alkaline battery as claimed in claim 6, wherein the cathode active material is incorporated with silver-nickelite (AgNiO2).

11. An alkaline battery as claimed in claim 10, wherein said silver-nickelite incorporated with the cathode active material comprises in an amount not less than 5 wt % to not more than 60 wt %.

12. An alkaline battery having a cathode can and an anode cup, wherein the open end of the anode cup is folded back to form a fold along a periphery of the anode cup, comprising:

a layer formed on an inside region of the anode cup and not on a bottom and an outer periphery of the fold, wherein the layer comprises a material having a higher hydrogen overpotential than copper.

13. An alkaline battery as claimed in claim 12, wherein the layer comprises at least one species of tin, indium, and bismuth or an alloy thereof.

14. An alkaline battery as claimed in claim 12, wherein the cathode can contains a cathode mix, and the cathode mix comprises one of silver oxide and manganese dioxide.

15. An alkaline battery as claimed in claim 12, wherein the cathode can contains a cathode mix, and the cathode mix comprises silver nickelite.

16. An alkaline battery as claimed in claim 12, wherein the anode cup contains an anode mix, and the anode mix comprises one of mercury-free zinc and zinc alloy powder.

17. An alkaline battery as claimed in claim 16, wherein the anode mix is separated from a cathode mix by a separator, and the anode mix is impregnated with an alkaline electrolytic solution.

18. An alkaline battery as claimed in claim 12, further comprising a gasket interposed between the fold and an open end of the cathode can.

* * * * *